United States Patent
Lacaze et al.

(10) Patent No.: US 11,234,201 B2
(45) Date of Patent: Jan. 25, 2022

(54) BROADCAST RANGING RADIOS FOR LOCALIZATION AND TIMING

(71) Applicant: ROBOTIC RESEARCH OPCO, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 0 days.

(21) Appl. No.: 16/435,610

(22) Filed: Jun. 10, 2019

(65) Prior Publication Data

US 2020/0389861 A1 Dec. 10, 2020

(51) Int. Cl.
*H04W 56/00* (2009.01)
*H04B 10/116* (2013.01)

(52) U.S. Cl.
CPC ...... *H04W 56/0025* (2013.01); *H04B 10/116* (2013.01); *H04W 56/003* (2013.01); *H04W 56/006* (2013.01)

(58) Field of Classification Search
CPC .......... H04L 67/12; G01S 5/06; H04B 1/0028
See application file for complete search history.

(56) References Cited

U.S. PATENT DOCUMENTS

| | | | | |
|---|---|---|---|---|
| 5,056,106 A | * | 10/1991 | Wang | A63B 69/36 375/130 |
| 2010/0087204 A1 | * | 4/2010 | Islam | H04W 24/00 455/456.1 |
| 2010/0176989 A1 | * | 7/2010 | Kim | G01S 19/02 342/357.48 |
| 2010/0200296 A1 | * | 8/2010 | Camwell | E21B 47/0224 175/50 |
| 2010/0328073 A1 | * | 12/2010 | Nikitin | G01S 5/12 340/572.1 |
| 2011/0090761 A1 | * | 4/2011 | Nishino | G06F 3/0433 367/127 |
| 2012/0010989 A1 | * | 1/2012 | Ramer | G06Q 30/0247 705/14.46 |
| 2012/0143004 A1 | * | 6/2012 | Gupta | A61B 1/00096 600/117 |

(Continued)

*Primary Examiner* — Zhiren Qin
(74) *Attorney, Agent, or Firm* — RowanTree Law Group, PLLC; Carson C. K. Fincham

(57) ABSTRACT

A broadcasting method has been developed that no longer uses the point-to-point measurements that causes the bottlenecks due to the number of measurements that need to be taken increasing non-linearly with the number of nodes. In addition, not all nodes need to emit. This results in significantly less expensive devices that can be paired with emitting nodes in the infrastructure. The energy emitted by the group is lowered and there is significantly less bandwidth that is used compared to current systems. This system is designed to synchronize remote clocks and localize a group of nodes and comprises at least 4 ranging nodes equipped with a clock, the capability to send and receive messages, the capability to time-tag messages, the capability for the nodes to compute the two sheeted hyperboloids from the emissions of other nodes, and the capability of combining multiple hyperboloids to solve the localization equations.

12 Claims, 2 Drawing Sheets

(56) References Cited

U.S. PATENT DOCUMENTS

| | | | |
|---|---|---|---|
| 2012/0328037 A1* | 12/2012 | Hsu | G01S 7/4814 |
| | | | 375/267 |
| 2014/0112104 A1* | 4/2014 | Calvarese | G01S 5/22 |
| | | | 367/127 |
| 2016/0054425 A1* | 2/2016 | Katz | G01S 3/14 |
| | | | 342/417 |
| 2017/0046893 A1* | 2/2017 | Tseng | G07C 9/28 |
| 2017/0155931 A1* | 6/2017 | Nicas | H04N 21/6143 |
| 2017/0273054 A1* | 9/2017 | Beitler | H04W 64/003 |
| 2018/0180709 A1* | 6/2018 | Eaves | H04L 67/18 |

* cited by examiner

BROADCAST RANGING RADIOS FOR LOCALIZATION AND TIMING

CROSS-REFERENCES TO RELATED APPLICATIONS

Not Applicable.

BACKGROUND OF THE INVENTION

1. Field of the Invention

The present invention involves the development of a broadcasting method that no longer uses the point-to-point measurements that causes the bottlenecks due to the number of measurements increasing non-linearly with the number of nodes. Just as important, not all nodes need to emit. This results in significantly less expensive devices that can be paired with emitting nodes in the infrastructure. Overall, the energy emitted by the group is lowered. Also, there is significantly less bandwidth that is used compared to current systems.

2. Description of Related Art

The statements in this section merely provide background information related to the present disclosure and may not constitute prior art.

There have been no reports in the patent literature of the use of broadcasting ranging radios for localization and time without the use of point-to-point communications.

There has been a radio communication system developed using point-to-point and point-multipoint user information communications. Overall, an information communication scheme that enables the radio base station to carry out point-to-point user information communications as well as point-to-multipoint user information communications has been demonstrated. A correspondence between the first media access identifier and the radio terminal is broadcast and user information destined to the radio terminal is transmitted through a time-slot corresponding to the first media access control identifier. A second media access identifier is allocated to a multicast information identifier, a correspondence between the second media access control identifier and the multicast information identifier is transmitted. The multicast information is transmitted with a time-slot corresponding to the second media access control identifier. This invention is discussed in U.S. Pat. No. 7,321,569. It is work noting that this patent deals with the use of point-to point and point-to-multipoint communications which is opposite of what is being discussed in the present invention. The present invention discusses broadcasting without the use of point-to-point communications.

This invention deals with a point-to-multipoint communications which occurs in a wireless mobile communications system formed by a multimedia service from the wireless network with the wireless network that provides multipoint with radio mobile terminal in which a multimedia service receives many-to-many points over two or more common physical channels between the wireless network and the wireless mobile channel. The invention is discussed in Korean Pat No. 101041814B1. It is worth noting that this system involves point-to-multipoint communications which is different from the present invention which involves no point-to-point communications being present.

There has been another patent which discusses point-to-multi-point communications. Here, a method of receiving system information that is performed by a user equipment is described. This method that is discussed includes receiving an indicator from a network that notes a change in system information related to point-to-multipoint service on a physical control channel and receiving changed system information related to the point-to-multipoint service in response to the indication. This method is discussed in U.S. Pat. No. 8,467,329. Again, this patent deals with point-to multipoint communications while the present invention deals with not using point-to-point communications.

Overall, there has not been any patent or patent applications in the literature that involve not using point-to-point communications for broadcast ranging radios used for localization and timing.

SUMMARY OF THE INVENTION

A broadcasting ranging radio method has been developed that no longer uses the point-to-point measurements which causes the bottlenecks that are encountered due to the number of measurements that need to be taken increasing non-linearly with the number of nodes.

In addition, just as important, not all the nodes need to emit which result in significantly less expensive devices that are be paired with emitting nodes in the infrastructure.

The energy emitted by the group of nodes is lowered and there is significantly less bandwidth that is used in the present system compared to the systems currently used today.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF THE INVENTION

Figure 1:
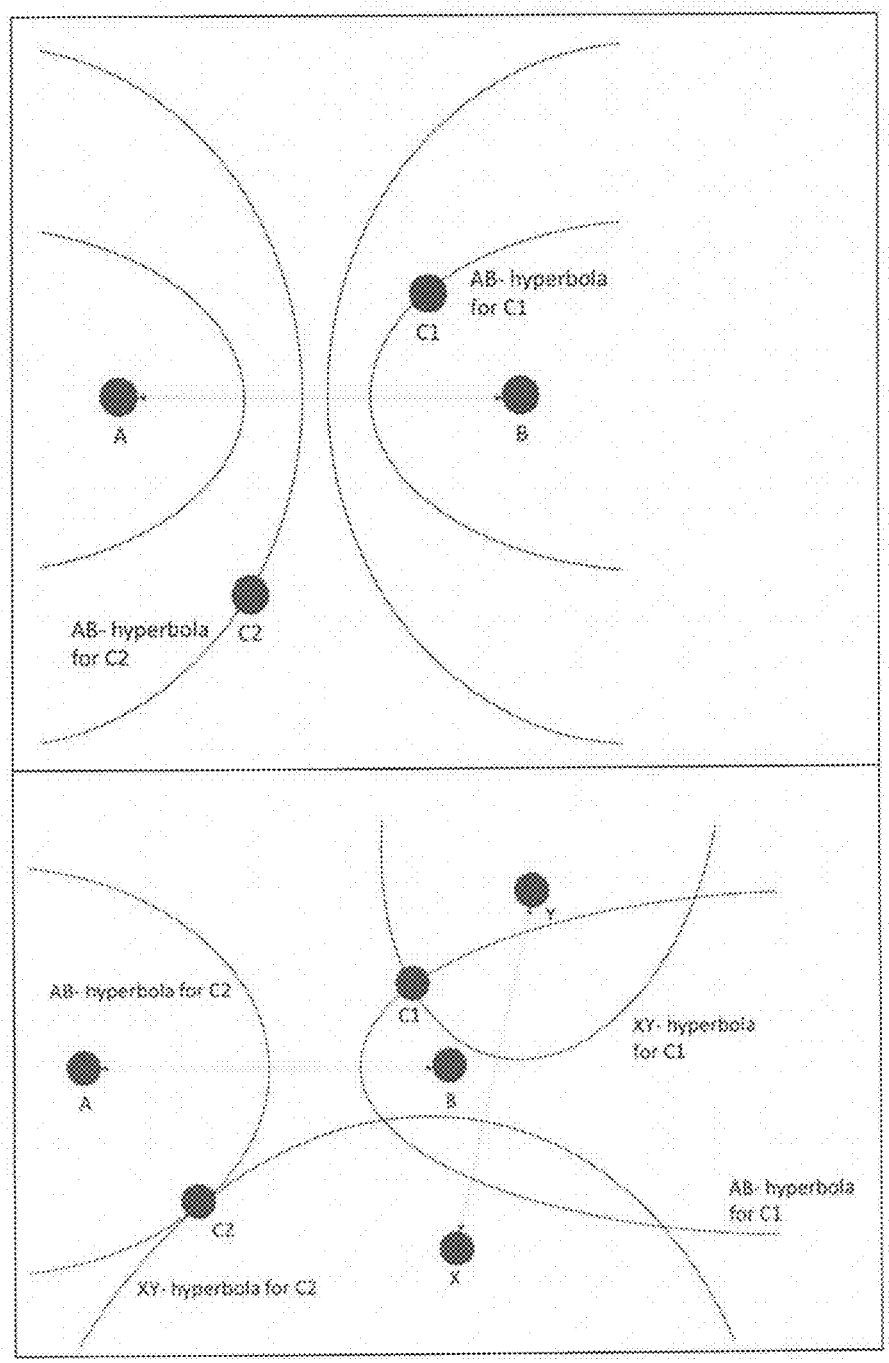
FIG. 1—Solution for 2D is shown using two pings—AB and XY for the generation of hyperboloids rather than spheres.

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

GPS has paved the way for a variety of applications, and our infrastructure has gotten accustomed to utilizing GPS both for localization and for timing. However, when GPS is not available or not sufficiently accurate, there are a variety of methods available for localization using RF. Specifically ranging radios are often used for this purpose. There is a variety of transport waveforms and protocols that can be used for ranging radios, but the commercially available devices use point to point measurements and a "ping-pong" messaging protocol to localize. Sub-centimeter accuracies have been achieved using these UWB radios.

One of the issues with the use of ranging radios in this manner is that because the ranges are point to point, the number of measurements that need to be taken increases non-linearly with the number of nodes. In other words, in a busy highway with hundreds of cars, each car will need to make a measurement to each other car and to the roadway infrastructure to fully discover the topology and provide safety. Because the vehicles are dynamic faster measurements are needed than the point to point mechanisms can provide.

The present invention provides significant advantages of the state of the art by providing a broadcasting method that no longer uses the point to point measurements that cause the bottlenecks. Just as important, in the present invention, not all nodes need to emit. This opens the door for significantly less expensive devices that can paired with emitting nodes in the infrastructure. The present invention lowers the energy emitted by the group and utilizes significantly less bandwidth than the current systems.

In traditional ranging radios, there is a set of messages exchanged by two nodes. The first node sends a message to the second node. Upon receipt, the second node returns the message to the first node. The delay taken by the second node between reception and transmission is known and very repeatable. Therefore, when the second message is received, the first node can know the distance between them by measuring the difference in time between when it sent the message and when it received it (and subtracting the time that it took the second node to respond). By sending the message back to the second node (from the first node), the second node can also determine the time and therefore compute the distance. This "ping-pong" of messaging is usually repeated a few times to average out the errors and possibly to eliminate outliers.

This mechanism is well known but it suffers from some significant problems. Let's say that we have 100 nodes. In order to fully determine the location of all of the nodes, the system will need to perform many measurements. Specifically, the first node will need to establish the ping-pong with the other 99 nodes. The second will need to do the same with 98 nodes, etc. Therefore, the total number of ping pongs will be $$(n-1)\binom{n}{2} = \frac{1}{2}n^2 - n/2$$

Where n^2 is the driving factor as the number of nodes increases. Even if these point to point measurements are performed in fast succession, because of the nonlinear effect, the number of measurements will not be enough if the number of nodes gets high and measurements of moving vehicles are needed for safety or signaling. In the above example, it could take seconds for the group of one hundred vehicles to determine their location. Given that the vehicles could be driving at higher speed, the raw positioning provided by the ranging radios could have 10s of meters in error.

In this system, the nodes can broadcast and therefore, the timing required to localize the group of vehicles is significantly smaller and does not increase as the square of the number of nodes, allowing for all vehicles to know their position faster.

Let's assume that radio A is going through the steps of ranging to radio B with no modification to the protocol shown above. Radio C could be listening to these messages going back and forth from Radio A to Radio B. Moreover, Radio C can use its own internal clock to time tag the messages sent between A and B. Radio C can also by decoding the internal messages of the ranging radio (often called Final and Report messages) to find some aspects of the distance between A and B using the equation shown in FIG. 1. As expected, Radio C does not have all the information necessary to fully localize with respect to radio A or B, however, it can significantly reduce the space of its possible location. By solving these equations in 3D, this solution forms what is called a two-sheeted hyperboloid. In other words, with a single ping-pong between two radios, we have restricted the position of the emitters to their own hyperboloid. By repeating this process two more times, the position can be fully determined. Since the hyperboloids can be fully described with 4 parameters, the information necessary to be added to Poll message only includes 4*3 parameters.

A passive listener can use an extension of trilateration with the difference being that instead of having a single synchronized source (aka GPS, LORAN), we have two sources that are not synchronized with the desired AC and BC observable though not independently from each other. The solutions generate hyperboloids rather than spheres.

Figure 2:
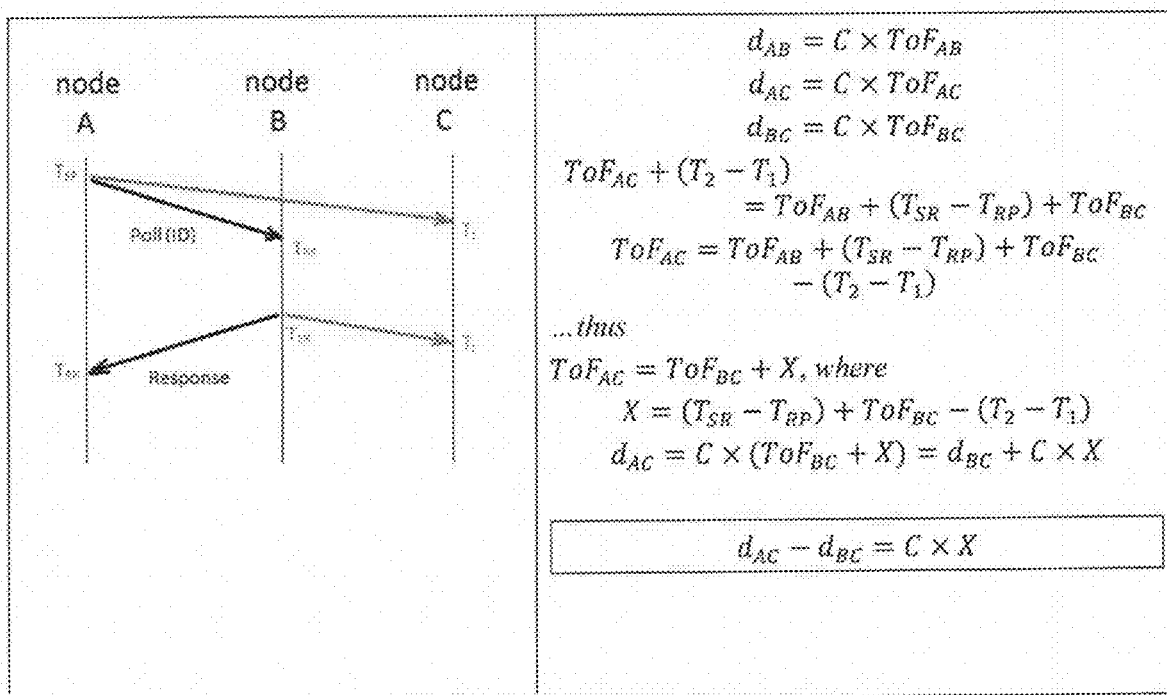
FIG. 2—The process of the solution generating hyperboloids rather than spheres presented in more detail.

FIG. 2 explains the process with a bit more detail. The chart shows the hyperboles instead the two sheeted hyperboloids as 2D becomes easier to visualize.

First Radio A and B perform their ping pong. Radios C1 deduce its hyperbole by snooping on messages sent between A and B and using its internal clock to measure times of flights between A and C1 and B and C1. Because there is no synchronized clock between any of these nodes, the solution can only be restricted to the shown hyperbole. At the same time, radio C2 (another node or c1 now in a different location) makes the same time tagging using its own internal clock, and therefore can also deduce its own hyperbole. After this is complete, a ping pong is performed between radios X and Y. Radio C1 and C2 can determine their hyperboles with respect to the XY handshake.

Because X and Y also have their hyperbole created by the AB handshake, by sharing the hyperboles generated by the AB handshake, C1 and C2 can find two solutions by intersecting their respective AB hyperbole and their XY hyperbole. Similarly, B and X can be the same node further simplifying the solution. There are two solutions for the intersection, therefore the process needs to be repeated once more to fully determine the relative positions of all nodes. Once the third handshake is performed, each node capable of snooping on the three handshakes will know its position with respect to each of the 6 nodes (at least 4 unique) used for the handshakes and the position of the six nodes with respect to each other.

The algorithm does not make any assumptions as far how many of the nodes are within the communication bubble.

The invention being taught here has several advantages. There is a possibility of having nodes that do not emit. Some or most of the nodes can be "receive only" nodes. This allows for lower cost units and less RF emissions. The number of messages needed to localize the complete set of nodes does not increase with the number of nodes as opposed to the traditional point to point where the complexity is n^2. In the presented invention, the complexity is a low constant. The bandwidth used by the system is proportional to the number of messages sent. Since the invention uses less messages, the bandwidth used is significantly less than in the conventional point to point. The time necessary to localize all the nodes is proportional to the number of messages sent. Since the invention uses less messages, the amount of time necessary to localize and synchronize the complete system is significantly reduced.

The present invention discloses a system designed to synchronize remote clocks and localize a group of nodes comprising at least 4 ranging nodes equipped with a clock, the capability to send and receive messages, the capability of each note to time tag messages, the capability of the nodes of composing the two sheeted hyperboloids from the emissions of other nodes and the capability of combining multiple hyperboloids to solve the localization equations.

Hyperboloids refers to a solid or a surface having plane sections that are hyperbolas, ellipses, or circles. The surface may be generated by rotating a hyperbola around one of its principal axes. A hyperboloid is a surface that may be obtained from a hyperboloid of revolution by deforming it by means of directional scaling, or more generally, of an affine transformation.

In this system, some of the nodes emit and other nodes just passively listen to the messages of the other nodes. A node is a basic unit of a data structure, such as a linked list or tree data structure. Nodes contain data and also may link to other nodes and some nodes emit. Links between nodes are often implemented by pointers. The nodes are carried by vehicles. Some of the nodes are in vehicles and some of the nodes are in the infrastructure. Some of the nodes use the traditional ping pong, and the rest of the infrastructure uses the presented broadcasting mechanism.

In the system, the determination of which nodes emits depend on whether the nodes are part of the infrastructure or they are carried by a vehicle. The emission power is different among the nodes. The message broadcasted is also used to transmit the speed, inertial, or other localization information of the vehicle. The messages broadcasted provide the absolute location of the nodes that are attached to the transportation infrastructure of the vehicles. The messages broadcasted provide the absolute location of the nodes that are attached to the transportation infrastructure.

In this system, there is a database at each node that provides the location of each node attached to the transportation infrastructure. One or more nodes has an atomic clock and the moving nodes not only broadcast the current estimated position, but they also send the planned trajectory as part of the message.

In this system, the atomic clock is used to maintain a synchronized time and therefore the number of emitters can be diminished to a single emission. The moving node can determine the distance to the infrastructure node with a single ping or a time if the location of the infrastructure node is known. An atomic clock is an extremely accurate type of clock which is regulated by the vibrations of an atomic or molecular system such as cesium or ammonia.

In this system, the time is first synchronized by the nodes, and further emissions are used to solve for locations while maintaining the time internally with the clock. The nodes in the infrastructure have atomic clocks but the moving nodes do not.

In this system, GPS is used by the nodes to synchronize their clocks based on their known position. The nodes are higher frequencies than RF (radio frequency) going to IR (infrared) or visible spectrum to send messages. Also, the nodes use UWB (ultra-wideband) for sending the messages. UWB is a radio technology that can use a very low energy level for short-range, high-bandwidth communications over a large portion of the radio spectrum. UWB has traditional applications in non-cooperative radar imaging.

In this system, the nodes use an interferometer method to determine distance between nodes. Interferometers are investigative tools used in many fields of science and engineering. They are called interferometers because they work by merging two or more sources of light to create an interference pattern, which can be measured and analyzed; hence 'Interfere-meter'. The interference patterns generated by interferometers contain information about the object or phenomenon being studied. They are often used to make very small measurements that are not achievable any other way.

The embodiments of the invention in which an exclusive property or privilege is claimed are defined as follows:

1. A method of ranging radio localization utilizing broadcast messaging, comprising:
    broadcasting, from each of at least four ranging nodes equipped with a clock and an emitter, a time-tagged message, wherein the clocks of the at least four ranging nodes are not synchronized and wherein each of the at least four ranging nodes comprises an in-atmosphere vehicle;
    receiving, by a receiver node equipped with a receiver, each of the time-tagged messages;
    computing, by the receiver node and based on the received time-tagged messages from the at least four ranging nodes, a plurality of two-sheeted hyperboloids; and
    computing, by the receiver node and based on the plurality of two-sheeted hyperboloids, a location of the receiver node.

2. The method of claim 1, wherein the emission power is different among the at least four ranging nodes.

3. The method of claim 1, wherein the time-tagged messages comprise data indicative of a speed of the respective at least four ranging nodes.

4. The method of claim 1, further comprising:
    storing, in a database, a location of each of the receiver node and the at least four ranging nodes.

5. The method of claim 1, wherein the time-tagged messages are transmitted at a frequency in the infrared or visible spectrum.

6. The method of claim 1, wherein the time-tagged messages are transmitted utilizing Ultra Wide Band (UWB).

7. The method of claim 1, wherein at least one of the receiver node and the at least four ranging nodes comprise an interferometer.

8. The method of claim 7, further comprising:
    calculating, by the interferometer, a distance between at least two of the receiver node and the at least four ranging nodes.

9. A method of ranging radio localization utilizing broadcast messaging from unsynchronized emitters, comprising:
    broadcasting, from a first ranging node equipped with a clock and an emitter, to a second ranging node equipped with a clock and an emitter, a first time-tagged message;
    broadcasting, from the second ranging node to the first ranging node, a second time-tagged message;

broadcasting, from a third ranging node equipped with a clock and an emitter, to a fourth ranging node equipped with a clock and an emitter, a third time-tagged message;

broadcasting, from the fourth ranging node to the third ranging node, a fourth time-tagged message;

broadcasting, from a fifth ranging node equipped with a clock and an emitter, to a sixth ranging node equipped with a clock and an emitter, a fifth time-tagged message;

broadcasting, from the sixth ranging node to the fifth ranging node, a sixth time-tagged message;

receiving, by a receiver node equipped with a receiver, each of the first, second, third, fourth, fifth, and sixth time-tagged messages;

computing, by the receiver node and based on the received first, second, third, fourth, fifth, and sixth time-tagged messages, three two-sheeted hyperboloids; and computing, by the receiver node and based on the three two-sheeted hyperboloids, a location of the receiver node.

10. The method of claim 9, wherein the fifth ranging node is the first ranging node and wherein the sixth ranging node is the second ranging node.

11. The method of claim 9, wherein the fifth ranging node is the third ranging node and wherein the sixth ranging node is the fourth ranging node.

12. The method of claim 9, wherein each ranging node comprises a land-based vehicle.

* * * * *